F. ATHERTON.
AUTOMATIC TIRE HOLDER.
APPLICATION FILED OCT. 18, 1915.
1,185,966.
Patented June 6, 1916.
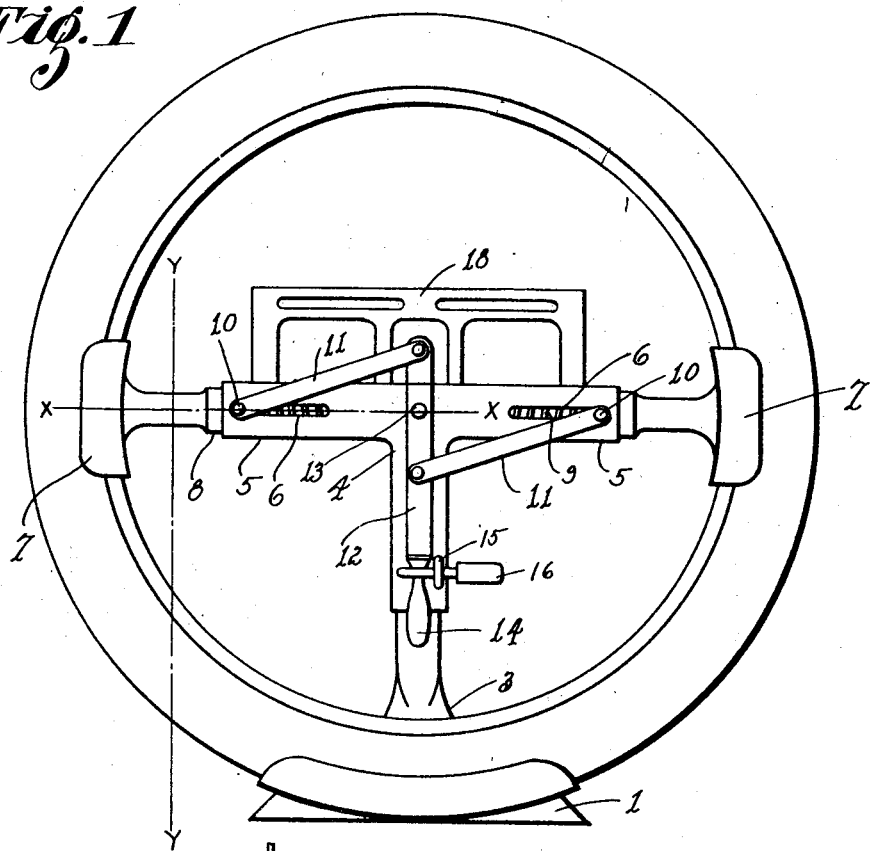
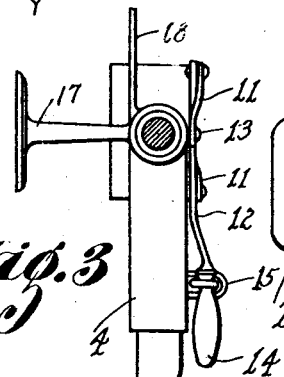
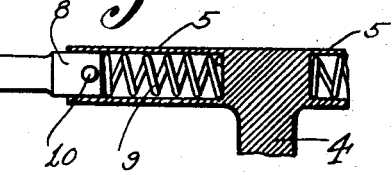
WITNESS:
F. M. Blanchard
INVENTOR.
Frank Atherton
BY
ATTORNEY

UNITED STATES PATENT OFFICE.

FRANK ATHERTON, OF JAMESTOWN, CALIFORNIA.

AUTOMATIC TIRE-HOLDER.

1,185,966.

Specification of Letters Patent. Patented June 6, 1916.

Application filed October 18, 1915. Serial No. 56,377.

*To all whom it may concern:*

Be it known that I, FRANK ATHERTON, a citizen of the United States, residing at Jamestown, in the county of Tuolumne, State of California, have invented certain new and useful Improvements in Automatic Tire-Holders; and I do declare the following to be a full, clear, and exact description of the same, reference being had to the accompanying drawings, and to the characters of reference marked thereon, which form a part of this application.

This invention relates to improvements in tire holders used in connection with motor vehicles for holding the extra tires or rims on the vehicle.

The object of the invention is to produce a holder by means of which the said extra tire or rim may be readily and easily placed in the holder and held there by a simple frictional engagement of the holding arms. This frictional engagement may then be released by the movement of a single member in a rapid and efficient manner.

The invention also embodies a lock used in connection with the holder and certain other advantageous features as will appear.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a front elevation of the complete device showing the tire held thereby. Fig. 2 is a sectional view taken on a line X—X of Fig. 1. Fig. 3 is a sectional view of the device taken on a line Y—Y of Fig. 1. Fig. 4 is a sectional view showing a modified form of retaining member arranged for engagement with two tires instead of one.

Referring now more particularly to the characters of reference on the drawings, I first provide a base member 1 arranged to be bolted or otherwise secured to the rear hangers 2, or fixed to the car body in any other satisfactory manner. Projecting upwardly from the member 1 is a bottom retaining socket 3 adapted to receive the tires.

A supporting arm 4 projects upwardly from the member 3 and is provided with a pair of branch tubular members 5 arranged at right angles thereto, each member 5 being provided with a longitudinal slot 6. The retaining members each comprise a head 7 arranged to fit the inner circumference of the rim or tire and provided with a plunger 8 movable in the tubular member 5 against the push spring 9. The said springs 9 normally hold the retaining member 7 in frictional contact with the inner periphery of the rim or tire thus clamping the same in position on the holder. To remove the retaining members from engagement with the rim or tire and allow the same to be removed from the holder, I have provided the following structure, namely: On each of the plungers 8 is a pin 10 which projects through one of the slots 6. A link 11 connects each pin 10 with a lever 12 on opposite sides of its fulcrumed point 13 on the member 4. Said lever 12 is provided with a handle 14 which normally projects vertically parallel with the member 4 when the tire or rim is clamped in the holder. To remove the member 7 from engagement with the tire or rim, the said handle 14 is grasped and moved in such a manner as to cause the links 11 to draw the plungers 8 toward each other against the pressure of the springs 9. This allows the removal of the rim or tire. Also when the rim or tire is to be placed in the holder the lever 14 is moved in a similar way and the rim and tire positioned, and then by allowing the springs 9 to force the tires to normal position again, the said tire and rim is again clamped into the holder. Adjacent the normal position of the handle 14 is a staple 15 so that the lock 16 may be engaged with the staple and handle to prevent unauthorized operation of the lever 14.

In Fig. 4 is shown a modified view of the head wherein the said head 7ª is provided with double engaging members 7ᵇ and 7ᶜ so that the same can be used to engage two rims or tires.

The numeral 17 designates the brace or supporting frame secured to the body of the car and to the holder in order to hold it perfectly rigid. Projecting upwardly from the holder may be a suitable plate or bracket 18 for carrying the light or number plate of the vehicle.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent, is:

1. A device of the character described comprising a supporting member, a pair of retaining members movable transversely with respect to the supporting member and arranged for engagement with a rim or tire, a lever fulcrumed on the supporting member, and links pivoted to the lever and to the retaining members for moving the retaining members in and out of contact with the rim or tire with the operation of the lever as described.

2. A device of the character described comprising a support, tubular members carried by the support, retaining members movable in the tubular members and arranged for contact with a rim or tire, means normally pressing the retaining members outwardly, a lever fulcrumed on the support and links connecting the lever and retaining members whereby with the movement of the lever the retaining members may be moved in the tubular members, as described.

3. A device of the character described comprising a support, tubular members carried on the support and provided with slots on their sides, spring-pressed retaining members movable in the tubular members and arranged for contact with a rim or tire, a lever fulcrumed on the support, links connected with the lever, and pins connected with the links and retaining members and movable through said slots, as described.

In testimony whereof, I affix my signature.

FRANK ATHERTON.